Patented Feb. 8, 1938

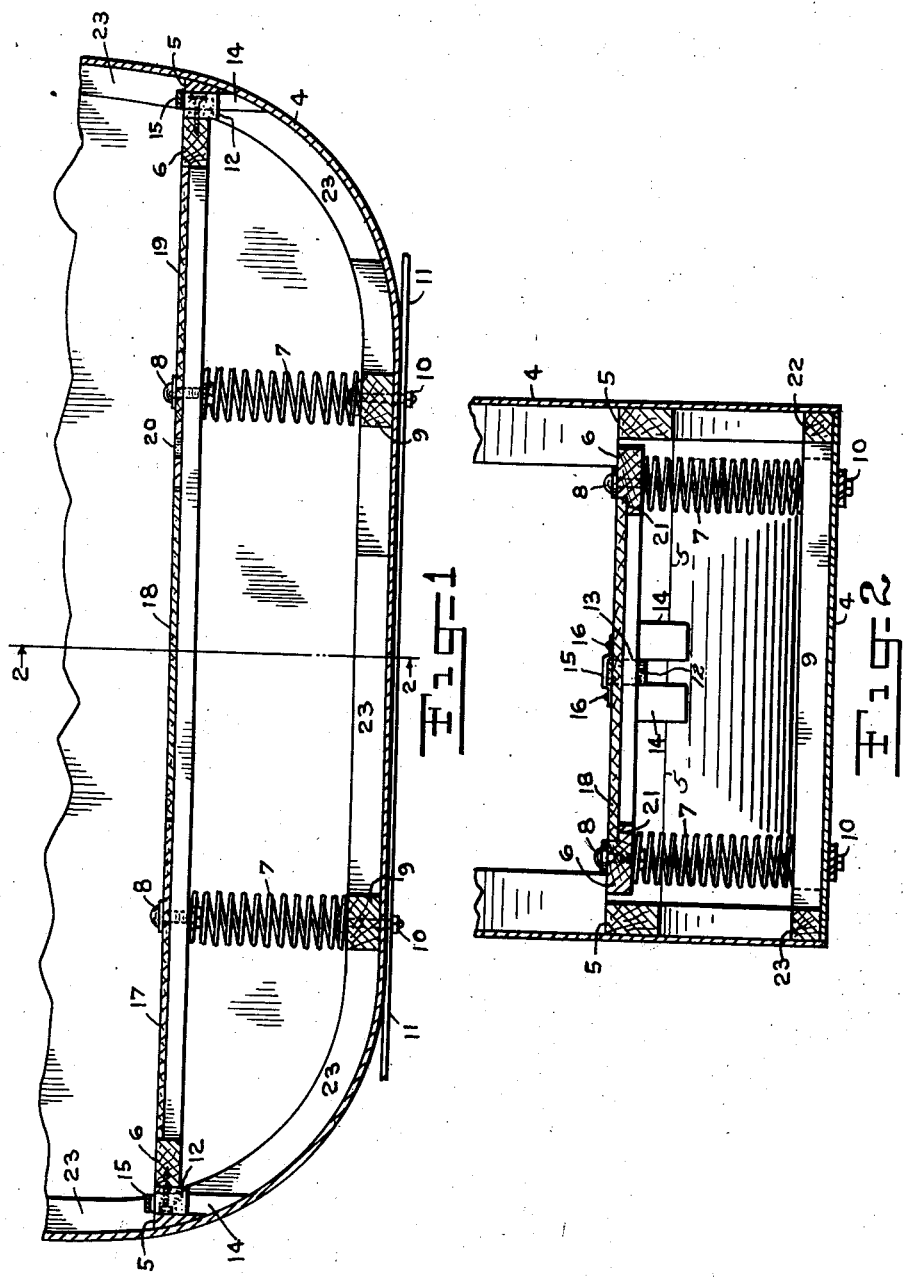

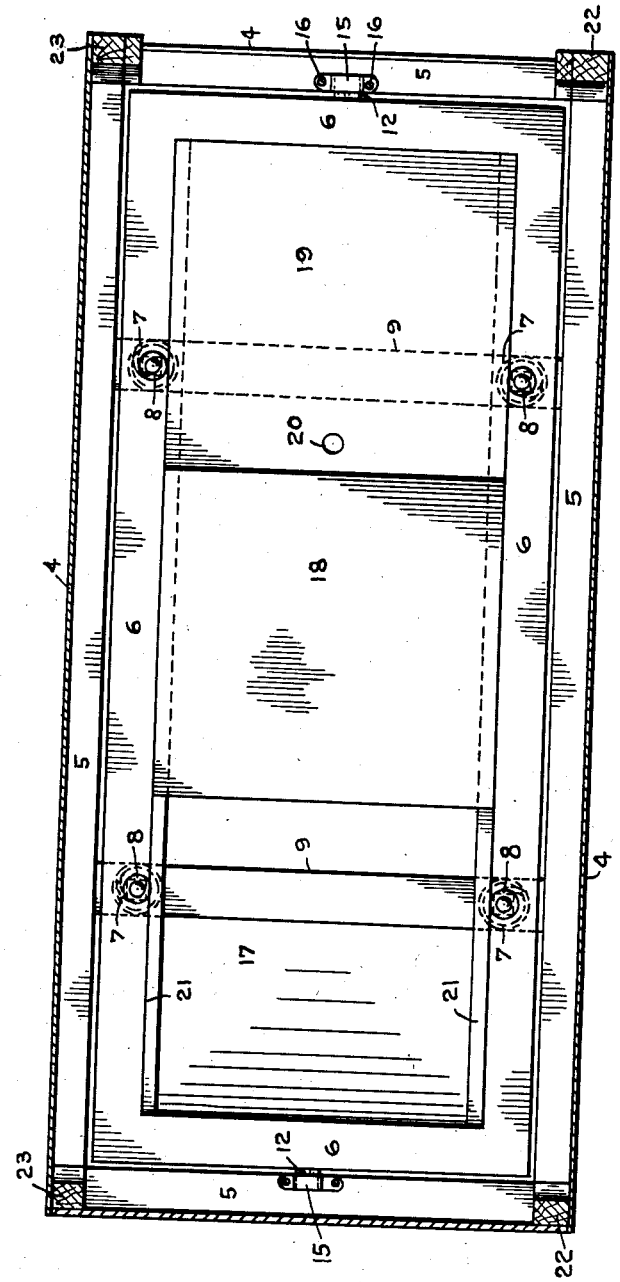

2,107,855

UNITED STATES PATENT OFFICE 2,107,855

BABY CARRIAGE BED

Samuel Drexler, Brooklyn, N. Y., assignor to Meyer S. Harrison and Elias Specter, doing business under the firm name and style of Bilt-Rite Baby Carriage Co., Brooklyn, N. Y.

Application July 10, 1936, Serial No. 89,894

4 Claims. (Cl. 280—47)

My invention relates to an improvement in a baby carriage bed and its novelty consists in the combination and arrangement of parts as will be more fully hereinafter pointed out.

A baby carriage bed involves several problems which are not readily solved. First it must be comfortable and in all ways yieldable as the baby lies thereon. It must also be free from injury by water and finally should provide easy access to and permit use of the valuable storage space thereunder.

My device combines all three of these features being supported on resilient supports which enable it to yield easily in any direction but preventing too great a tilt and being impervious to liquids and permitting easy access to the storage space beneath it which is kept free for use.

Referring to the drawings Figure 1 is a longitudinal vertical section showing my structure as mounted in a baby carriage body, the upper portion of which is broken away for convenience in illustration.

Figure 2 is a cross vertical section on the line 2—2 in Figure 1.

Figure 3 is a top plan view of the baby carriage body with my structure mounted therein.

In the drawings 4 is a baby carriage body of the coach type having the usual longitudinal frame members 22 and 23 and an inner frame 5 running around the inner edge of said body 4 at the same level as bed frame 6 which is mounted therein and securely fastened to the upper ends of springs 7 by means of bolts 8, said springs 7 being turned sharply inwardly at their upper ends so as to fasten under said bolts 8 in the usual manner.

The lower ends of said springs 7 are fastened in the same manner as the upper ends to cross bar frame members 9 by means of bolts 10 which run through said cross bars 9 and also through the flat portion of the body supporting spring 11 which runs the entire length of the carriage body 4.

At each end of the bed frame 6 is rigidly secured a hard rubber guide block 12 which is flexible and slippery and guideways 13 are cut in the ends of the inner frame 5 and extended by extension guide members 14 rigidly secured immediately below said frame 5 and which are adapted to receive and guide said guide blocks 12. A limiting bar 15 is rigidly secured across the upper end of the guideways 13 to the frame 5 at 16 and the lower ends of guideways 13 and 14 are blocked by the curved ends of body 4.

The bed frame 6 has a right angle cut out edge 21 along both longitudinal edges adapted to receive and support cover members 17, 18 and 19 and a finger cut out 20 is cut in cover 19 to facilitate the easy lifting of said cover 19 thereby making the covers 18 and 17 readily accessible for removal and replacement.

The bed as thus constructed, being mounted on the four resilient springs will readily tilt in any direction as the guide blocks 12 will yield flexibly and slide easily in guideways 13 and extensions 14 so that the plane of the bed frame 6 and the cover members 17, 18 and 19 mounted in position thereon will be varied in any and all directions by the movement of the child as it lies or sits on the same and moves in different positions thereon.

The soft yielding of the springs 7 on which the bed frame 6 and its covers 17, 18 and 19 are supported therefore insures a perfect bed for the child, even though there were no mattress or pad used over the covers 17, 18 and 19.

The tilting of the bed frame 6 and the covers supported thereon is also definitely controlled and limited by the flexible guide blocks 12 secured to each end of the bed frame 6 and which easily slide in and are controlled by the guideways 13 and the extension guide members 14. The limiting bars 15 rigidly secured across the upper end of the guideways 13 prevents the guide blocks 12 from going beyond the same, particularly when the one end of the bed frame 6 is pressed downwardly to the extreme position of the block 12 against the curved end of body 4 when the opposite end will naturally tilt upwardly but will be through this construction absolutely limited and controlled.

We therefore have a construction which permits of the easy throw of the bed but which limits it so as to prevent unnecessary or dangerous tilting of the bed frame 6 but insuring all of the ease and comfort which the easiest riding bed can possibly furnish.

It will be seen further that this structure is impervious to water and that because of the ready removal of the cover member 19 by means of finger cut out 20 the cover members 17, 18 and 19 can be quickly and easily removed and replaced as desired so as to make perfectly accessible the storage space beneath said bed frame 6 and the covers 17, 18 and 19 in the bottom of the carriage body 4.

I claim:

1. In a baby carriage a body having a bottom frame and supporting springs mounted at their lower ends thereon, a bed frame flexibly mounted on the upper ends of said supporting springs and flexible means for guiding said bed frame permitting controlled side tilting and limited end tilting of said bed frame.

2. In a baby carriage body having an inner edge frame and a bottom frame and springs mounted on said bottom frame, a bed frame flexibly mounted on said springs supported on said bottom frame of said body and flexible means for guiding and limiting the end tilting of said bed frame comprising flexible slippery guiding blocks secured to each end of said bed frame so as to permit side tilting, and guideways with an upper limiting bar across the top of said guideways in alignment with said guiding blocks in said carriage body inner edge frame.

3. In a baby carriage body a bed frame flexibly mounted on the bottom of said body and flexible easily sliding means operating in guideways mounted at each end of said carriage bottom for guiding and limiting in all directions the tilting of said bed frame.

4. In a baby carriage body a bed frame flexibly mounted on the bottom of said body and flexible means for guiding and limiting the tilting of said frame comprising a flexible slippery guiding block secured to each end of said bed frame and a guideway at each end of said body adjacent to and adapted to receive said blocks and means for limiting the extent of movement of the same.

SAMUEL DREXLER.